(12) United States Patent
Berthereau et al.

(10) Patent No.: US 8,318,620 B2
(45) Date of Patent: Nov. 27, 2012

(54) GLASS YARNS CAPABLE OF REINFORCING ORGANIC AND/OR INORGANIC MATERIALS

(75) Inventors: Anne Berthereau, Columbus, OH (US); Jerome Lalande, Saint-Maur-des-Fosses (FR)

(73) Assignee: Saint-Gobain Technical Fabrics Europe, Chambery (FR)

( * ) Notice: Subject to any disclaimer, the term of this patent is extended or adjusted under 35 U.S.C. 154(b) by 289 days.

(21) Appl. No.: 12/663,087

(22) PCT Filed: Jun. 25, 2008

(86) PCT No.: PCT/FR2008/051152
§ 371 (c)(1),
(2), (4) Date: Feb. 17, 2010

(87) PCT Pub. No.: WO2009/007599
PCT Pub. Date: Jan. 15, 2009

(65) Prior Publication Data
US 2010/0184581 A1 Jul. 22, 2010

(30) Foreign Application Priority Data
Jun. 27, 2007 (FR) .................................... 07 56068

(51) Int. Cl.
*C03C 13/06* (2006.01)
*C03C 13/00* (2006.01)

(52) U.S. Cl. ................. 501/36; 501/35; 501/70; 65/454

(58) Field of Classification Search .................... 501/35, 501/36, 70; 65/454–470
See application file for complete search history.

(56) References Cited

U.S. PATENT DOCUMENTS

| | | | | |
|---|---|---|---|---|
| 3,900,329 A | * | 8/1975 | Grubb et al. | 501/70 |
| 6,043,170 A | * | 3/2000 | Steinkopf et al. | 501/36 |
| 6,156,683 A | * | 12/2000 | Grove-Rasmussen et al. | 501/35 |
| 6,284,684 B1 | * | 9/2001 | Vignesoult et al. | 501/36 |
| 6,313,050 B1 | | 11/2001 | De Meringo et al. | |
| 7,704,902 B2 | * | 4/2010 | Maquin et al. | 501/36 |
| 7,803,729 B2 | * | 9/2010 | Keller et al. | 442/340 |
| 2005/0085369 A1 | * | 4/2005 | Jensen | 501/35 |
| 2007/0087139 A1 | | 4/2007 | Creux et al. | |
| 2007/0135291 A1 | * | 6/2007 | Bernard et al. | 501/36 |
| 2007/0209401 A1 | | 9/2007 | Berthereau et al. | |
| 2007/0243995 A1 | | 10/2007 | Dallies et al. | |
| 2008/0125304 A1 | | 5/2008 | Berthereau et al. | |
| 2008/0182317 A1 | | 7/2008 | Maquin et al. | |
| 2008/0191179 A1 | | 8/2008 | Bernard et al. | |
| 2009/0286440 A1 | | 11/2009 | Lecomte et al. | |

FOREIGN PATENT DOCUMENTS

| | | |
|---|---|---|
| FR | 2 778 399 | 11/1999 |
| FR | 2 778 401 | 11/1999 |
| WO | 97 31870 | 9/1997 |
| WO | WO 2005035895 A1 * | 4/2005 |
| WO | 2006 103376 | 10/2006 |
| WO | WO 2006103376 A2 * | 10/2006 |

OTHER PUBLICATIONS

U.S. Appl. No. 12/519,584, filed Jun. 22, 2009, Berthereau, et al.
U.S. Appl. No. 12/600,843, filed Nov. 19, 2009, Lalande, et al.

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

The invention relates to a glass yarn capable of being obtained by a method consisting of mechanically drawing molten glass threads flowing from orifices disposed at the base of a die, of which the chemical composition is substantially free from boron oxide and comprises the following constituents within the limits defined hereinafter expressed in percentages by weight:

| | |
|---|---|
| $SiO_2$ | 40 to 50 |
| $Al_2O_3$ | 18 to 28 |
| CaO | 4 to 15 |
| MgO | 0 to 6 |
| $Na_2O$ | 10 to 14 |
| $Na_2O + K_2O + Li_2O$ | 13 to 20 |

It also relates to composites containing such yarns.

14 Claims, No Drawings

GLASS YARNS CAPABLE OF REINFORCING ORGANIC AND/OR INORGANIC MATERIALS

The instant application is the US counterpart of WO 2009/007599, the text of which is incorporated by reference, and claims the priority of French application No. 0756068, filed on Jun. 27, 2007, the text of which is incorporated by reference.

The present invention relates to glass yarns or fibers, designed in particular to reinforce organic and/or inorganic materials and that may be used as textile yarns, it being possible for these yarns to be produced by a method consisting of drawing molten glass threads flowing from orifices disposed at the base of a die.

It relates more particularly to glass yarns having a particularly advantageous novel composition.

The field of reinforcing glass yarns is a particular field of the glass industry. These yarns are produced from specific glass compositions, it being possible for the glass used to be drawn in the form of filaments of a few micrometers in diameter, according to the previously described method, and for yarns to be formed that are capable of fulfilling in particular their function as a reinforcement. The most commonly used reinforcing glass yarns as thus yarns formed of glasses of which the composition is derived from the eutectic composition of the tertiary diagram $SiO_2$—$Al_2O_3$—$CaO$ of which the temperature at the liquidus is 1170° C. These yarns are designated under the name of "E glass" yarns, of which the archetype is described in patent publications U.S. Pat. No. 2,334,961 and U.S. Pat. No. 2,571,074, and that have a composition essentially based on silica, alumina, lime and boric anhydride. The latter, present at concentrations extending in practice from 5 to 13% in glass compositions described as "E-glass" is added as a replacement for silica in order to reduce the temperature at the liquidus of the glass formed and to facilitate its fusion. The "temperature at the liquidus", noted "$T_{liq}$", is the term given for the temperature at which the most refractory crystal appears in a system at thermodynamic equilibrium. The temperature at the liquidus therefore gives the lower limit at which it is possible to form fibers. The forming margin is defined as the difference between the temperature at which the viscosity of the glass is 1000 poises (100 Pa·s), the temperature at which glass is generally formed into yarns and is noted "T3" in the remainder of the text, and the temperature at the liquidus.

E-glass yarns are characterized in addition by a limited content of alkali metal oxides (essentially $Na_2O$ and/or $K_2O$).

Application WO 96/39362 describes compositions without boron or fluorine, substantially formed from a quaternary system $SiO_2$—$Al_2O_3$—$CaO$—$MgO$, containing small quantities of titanium oxide (less than 0.9%). The compositions described, among which the composition of the fiber marketed under the name Advantex™ by Owens Corning appear, are characterized as regards their properties by a high specific Young's modulus, a high forming margin and a higher temperature T3 than that of E glass.

Considerations connected with the interaction between glass yarns and the human or animal system have also been developed. Mineral fibers are in point of fact capable, when certain geometric criteria are met in terms of diameter and/or length, of being introduced by inhalation into the system and in particular into the lungs and sometimes as far as the pulmonary alveoli. These considerations have been substantially developed in the field of mineral wools used for thermal or acoustic insulation, since the length and diameter of these fibers are quite small. On the other hand, glass yarns capable of reinforcing organic or inorganic materials are generally continuous (meshes, textile yarns, etc.) or, when they are chopped, have a length greater than 3 mm, which is much too high for being introduced into the system in air. Similarly, the diameter of yarns (which consist of several individual filaments) is generally much too high. It is only in the case where the yarns would be crushed that any dust could be inhaled. In order to avoid any pathogenic risk linked to a possible accumulation of such dusts in the system, it may appear valuable to make sure that said dusts have a low "biopersistence", that is to say they can be easily and rapidly eliminated from the system. The chemical composition of fibers is a major parameter influencing this capacity to be eliminated rapidly from the system, since it plays a considerable part in the rate of dissolution of fibers in a physiological medium. These fibers having a high dissolution rate in a physiological medium are called "biosoluble" fibers.

Application WO 03/050054 describes glass yarns of which the chemical composition has been adjusted (substantially by adding alumina $Al_2O_3$) to make the fibers biosoluble. Nevertheless, the forming margin for these fibers makes them unsuitable for being formed into fibers by a method consisting of mechanically drawing molten glass threads flowing from orifices disposed at the base of a die.

Application WO 2006/103376 describes mineral fibers, and in particular glass yarns capable of being obtained by a method consisting of mechanically drawing glass threads flowing from orifices disposed at the base of a die of which the biosolubility has been improved. The chemical composition of these glass yarns makes them capable of being obtained by a mechanical drawing method, in particular by virtue of the addition of sodium oxide in a large quantity (at least 14% by weight). These compositions however contain boron oxide.

The object of the invention is to provide glass yarns capable of being obtained by a method consisting of mechanically drawing molten glass threads flowing from orifices disposed at the base of a die, of which the chemical composition has properties similar to those obtained by glass yarns described in application WO 96/39362, in particular in terms of chemical durability, specific Young's modulus, the temperature T3 and the forming margin, while having a high dissolution rate in a physiological medium, in particular in pulmonary fluids. Another object of the invention is to provide glass compositions producing very little airborne matter, that is prejudicial to the environment, when they are melted.

To this end, the subject of the invention is glass yarns capable of being obtained by a method consisting of mechanically drawing molten glass threads flowing from orifices disposed at the base of a die, of which the chemical composition is substantially free from boron oxide and comprises the following constituents within the limits defined hereinafter expressed in percentages by weight:

| | |
|---|---|
| $SiO_2$ | 40 to 50 |
| $Al_2O_3$ | 18 to 28 |
| CaO | 4 to 15 |
| MgO | 0 to 6 |
| $Na_2O$ | 10 to 14 |
| $Na_2O + K_2O + Li_2O$ | 13 to 20 |

The composition of glass yarns according to the invention is substantially free from boron oxide $B_2O_3$. It is understood by this that it does not contain boric anhydride, with the exception of possible impurities (generally less than 0.05%, or indeed 0.01%) coming from the raw materials employed.

Silica ($SiO_2$) is an oxide forming the vitreous lattice and plays an essential part in its stability. Within the framework of the limits previously described, when the percentage of this constituent is less than 40% the glass obtained is not viscous enough and devitrifies too easily during drawing. For contents greater than 50% (taking account of the high alumina content) the glass becomes very viscous and difficult to melt and the temperature at the liquidus increases, the forming margin being reduced to become negative and preventing fiber formation by mechanical drawing. In addition, high $SiO_2$ contents penalize the biosolubility properties of the fibers. On account of this, the silica content is preferably less than or equal to 49%, and in a particularly preferred manner, less than or equal to 48%. Since silica plays an essential beneficial role in improving Young's modulus, its content is preferably greater than or equal to 42%, 43%, or indeed 44% and even 45% or 46%. A particularly preferred compromise consists of choosing a silica content of between 46 and 48%.

Alumina ($Al_2O_3$) also constitutes a lattice former for glasses according to the invention and plays a fundamental part in their stability. Within the framework of the limits defined according to the invention, a content less than 18% brings about a substantial increase in hydrolytic attack of the glass and too low a biosolubility, while an increase in the percentage of this oxide above 28% brings about risks of devitrification and too high an increase in viscosity and therefore the temperature T3. Taking into account in particular its harmful effect on the temperature T3, the alumina content is preferably less than or equal to 27%, or indeed 26% or 25%, particularly 24% or 23%. It has also been observed that beyond a certain threshold, high alumina contents are prejudicial to high biosolubility. Taking account, on the other hand, of its beneficial role on biosolubility and forming margin, the alumina content is preferably greater than or equal to 19% or indeed 20%. A valuable optimum enabling the beneficial properties of alumina to be best combined is situated between 20 and 23%.

The sum of silica and alumina contents, denoted $SiO_2+Al_2O_3$, is preferably greater than or equal to 66%, or indeed 68% and/or less than or equal to 75%, or indeed 72%.

Lime (CaO) and magnesia (MgO) make it possible to regulate the viscosity and to control the devitrification of glasses according to the invention. Within the framework of the limits defined according to the invention, a CaO content greater or equal to 15% brings about an increase of the temperature at the liquidus, preventing fiber formation by mechanical drawing. A CaO content below 4% brings about too low hydrolytic resistance. The CaO content is thus preferably greater than or equal to 5%, in particular 6% and/or less than or equal to 14%, or indeed 12% or 11%, and even 10% or 9.5%, or furthermore 9%, taking into account the effect of CaO on the increase in temperature at the liquidus. An optimum CaO content lies between 6 and 10%, or indeed between 6 and 9%. The MgO content is preferably greater than or equal to 1%, or indeed 2% and even 3% or 4% and/or less than or equal to 5%.

The sum of the CaO and MgO contents (noted CaO+MgO) is preferably less than or equal to 15%, or indeed 14% or even 13%.

The oxides of barium (BaO) and strontium (SrO) contribute to a significant increase in the cost of the glass. The individual content is thus preferably less than or equal to 5% or 2%, and even 1%, or indeed nil.

Alkali metal oxides are indispensable in compositions according to the invention for making glass capable of being formed into fibers by a mechanical drawing method. The glasses described in application WO 96/39362 do not contain alkali metal oxides, or contain them in a very small amount, but nevertheless may be formed into fibers by mechanical drawing by virtue of high CaO contents (at least 20%). In the case of glasses according to the invention, for which the $SiO_2$ content is lowest and the $Al_2O_3$ content is the highest, the CaO content should be limited so as not to degrade the temperature at the liquidus too greatly. Sodium oxide ($Na_2O$) is introduced at a level of at least 10%, since for lower contents, the temperature at the liquidus is too high and increases more quickly than the viscosity of the glass, reducing the forming margin on account of this until it makes it negative, in this way preventing fiber formation by mechanical drawing. On the other hand, for contents above 14%, as described in application WO 2006/103376 mentioned above, it was apparent to the inventors that the viscosity fell more quickly than the temperature at the liquidus, certainly reducing the temperature at which yarns may be obtained, but also reducing the forming margin, making it obligatory to add boron oxide in order to obtain an adequate forming margin. The invention is therefore partly based on the fact that a restricted range of $Na_2O$ contents exists within which glass yarns without boron may be obtained by mechanical drawing with a good drawing quality. In order to obtain an optimum forming margin, the sodium oxide content is preferably greater than or equal to 11%, in particular 11.5% or indeed 12%, and/or less than or equal to 13.5%. Potassium oxide ($K_2O$) is also of value in increasing the forming margin by having a strong reducing action on the temperature at the liquidus. Also taking into account its high cost, potassium oxide is advantageously present at contents greater than or equal to 1%, or indeed 2% and even 3% or 4% and/or less than or equal to 8%, or indeed 7% or 6% or furthermore 5%.

The lithium oxide ($Li_2O$) content is preferably maintained below 0.5% and preferably less than 0.1%, or indeed 0.05% or 0.01%.

The total alkali metal oxide content ($Na_2O+K_2O+Li_2O$) is less than or equal to 20%, since beyond this value, the hydrolytic resistance and Young's modulus are appreciably downgraded, as well as the cost of the glass. This total alkali metal oxide content is preferably less than or equal to 19% or indeed 18% and even sometimes 17% or 16%. In order to ensure a good forming margin, the total alkali metal oxide content is preferably greater than or equal to 14%.

$Ti_2O$ is known as a fluidizing agent for glass and is capable of reducing the temperature at the liquidus. Beyond 1%, the yellow coloration and excess cost that it generates may become unacceptable for some applications. Ultraviolet absorption due to high contents of titanium may also be unacceptable when yarns are intended for reinforcing polymers of which crosslinking is achieved by means of UV radiation. For these various reasons, the titanium oxide content of glasses according to the invention is preferably less than or equal to 1%, or indeed 0.9%, and even 0.8%. Taking into account its favorable action on the resistance of glass yarns in an acid medium, its content may advantageously be greater than or equal to 0.5%.

Zinc oxide (ZnO) enables the viscosity of glasses according to the invention to be reduced and their resistance to corrosion in an acid medium to be increased. However, taking into account the high cost of this oxide, its content is preferably less than or equal to 0.4%, preferably less than or equal to 0.1%, or indeed less than 0.05% or 0.01%.

Zirconium oxide ($ZrO_2$) is capable of improving the resistance of glass yarns according to the invention in an acid medium. For this reason, the value of a content greater than or equal to 0.5% may be noticeable. Taking into account however its unfavorable role on the devitrification of glass, a content of less than or equal to 1% is preferred.

The magnesium oxide content is preferably less than 1%, and preferably less than 0.3%. Since this oxide is capable of giving glass a very intense violet coloration, the MnO level is preferably maintained at less than 0.1%, or indeed 0.05% and even 0.01%.

Fluorine may be added in a small quantity to improve the fusion of glass or may be present as an impurity. It has however been discovered that small quantities of fluorine very noticeably affect the temperature resistance of glasses according to the invention. The fluorine content is thus advantageously maintained below 0.5% and in particular less than 0.1%, or indeed nil, in particular for environmental reasons.

Iron oxide is an inevitable impurity in glasses according to the invention on account of its presence in several raw materials, and its content is generally less than 0.5%. Given that the coloration effect generally attributed to titanium is in fact due to an electron transfer between $Fe^{2+}$ and $Ti^{4+}$, the iron content in glass according to the invention is advantageously less than 0.3%, in particular 0.2%, by virtue of a judicious choice of raw materials.

In a preferred manner, the sum of the contents of $SiO_2$, $Al_2O_3$, CaO, MgO, $Na_2O$ and $K_2O$ is greater than or equal to 95% preferably 96% or 97%, or indeed even 98% or 99%. One or more other components (therefore different from those previously mentioned, $SiO_2$, $Al_2O_3$, CaO, MgO, BaO, SrO, $Li_2O$, $Na_2O$, $K_2O$, $TiO_2$, ZnO, $ZrO_2$, MnO, F, $Fe_2O_3$) may also be present, generally as impurities, in the chemical composition of yarns according to the invention, the total content in these other components generally remaining less than or equal to 5%, preferably less than 2% or 1%, the level of each of these other components generally not exceeding 0.5%. They may consist in particular of agents employed for refining glass (eliminating gaseous inclusions) such as sulfur, or compounds coming from the solution in glass of small quantities of materials used as refractories in the glass fusion furnace. These various impurities do not modify the way in which the glass yarns previously described solve the technical problem that is the basis of the invention.

The glass yarns according to the invention may be produced by employing E-glass yarns or Advantex™ glass.

The glass yarns according to the invention are preferably obtained from glasses with the previously described composition according to the following method: a multiplicity of molten glass threads, flowing from a multiplicity of orifices dispersed at the base of one or more dies, are drawn out in the form of one or more webs of continuous filaments and then reassembled into one or more yarns collected on a moving support. This may consist of a rotating support when the yarns are collected in the form of reels, or of a support moving in translation when the yarns are chopped by a device also serving to draw them out or when the yarns are projected by a device serving to draw them out so as to form a mat.

The subject of the invention is therefore also a method for producing glass yarns according to the invention, comprising the steps of drawing, in the form of one or more webs, continuous filaments from a multiplicity of molten glass threads flowing from a multiplicity of orifices disposed at the base of one or more dies, and of assembling said filaments into one or more yarns, collected on a moving support.

The glass yarns according to the invention may also be obtained by a method called a "glass staple fiber method", in which glass threads flowing out from a die are drawn out by means of compressed air jets, the discontinuous filaments obtained in this way raining down on a drum and then being collected so as to form a yarn. This yarn possesses a different structure from that obtained by mechanical drawing and exists in the form of a mesh of substantially parallel discontinuous filaments without twist.

The yarns obtained, possibly after other conversion operations, may thus exist in other forms: continuous yarns, chopped yarns, plaits, ribbons, mats, networks, etc. these yarns being composed of filaments with a diameter that may extend from approximately 5 to 30 micrometers.

The yarns according to the invention may exist in the following forms, among which will be found, by way of example and in a non-limiting manner:

chopped yarns, of which the length is generally of the order of a few millimeters, typically between 3 and 25 mm), crushed yarns, obtained by crushing base yarns, the length then typically varying between 0.1 and 0.5 mm, rovings obtained by assembling in balls or skeins, mats, a web either of continuous yarns or chopped yarns, in which the yarns are distributed without intentional orientation and are bonded together chemically or entangled with the aid of a needle loom, (needled mat), fabrics, an assembly of rovings or of yarns having undergone at least one twisting operation (single, plied or cabled yarns) obtained with the aid of a weaving loom composed of a warp and weft, webs obtained by a papermaking method or from chopped yarns.

The molten glass feeding the dies is obtained from possibly pure raw materials (for example coming from the chemical industry) but are more often natural, the latter sometimes including impurities in the trace state, these raw materials being mixed in suitable proportions so as to obtain the desired composition, then melted. The temperature of the molten glass (and therefore its viscosity) is adjusted in a traditional manner by the operator so as to enable the glass to be formed into fibers while in particular avoiding problems of devitrification and so as to obtain the best possible quality of the glass yarns. Before assembling them in the form of yarns, filaments are generally coated with a sizing composition enabling them to be protected against abrasion and facilitating their subsequent association with reinforcing materials.

Composites obtained from yarns according to the invention contain at least one organic material and/or at least one inorganic material and glass yarns, at least part of the yarns being glass yarns according to the invention.

The object of the invention is thus also a composite of glass yarns and organic and/or an inorganic material or materials containing glass yarns according to the invention.

As the case may be, glass yarns according to the invention may already have been associated, for example during drawing, with filaments of organic materials so as to obtain composite yarns. By extension, "glass yarns of which the composition comprises etc." is understood to mean, according to the invention, "yarns formed from glass filaments of which the composition comprises etc.", the glass filaments being possibly associated with organic filaments before the filaments are assembled into yarns.

Taking into account their good strength properties at high temperatures, the glass yarns according to the invention may also be used for cladding exhaust mufflers of motor vehicles. In this particular application, the glass yarns according to the invention confer good sound insulation properties but are also subjected to temperatures that may exceed 850° C. or even 900° C.

The advantages exhibited by glass yarns according to the invention will be better assessed by means of the following examples, illustrating the present invention without however limiting it.

Table 1 gives together four examples according to the invention numbered 1 to 4, and two comparative examples, numbered C1 and C2. C1 is a glass composition of the Advantex™ type derived from the teaching of the application of WO 96/39362. C2 is an example derived from application WO 03/050054.

The composition of glasses is expressed in weight percentages of oxides.

In order to illustrate the advantages of glass compositions according to the invention, table 1 presents the following properties:

the temperature corresponding to a viscosity of $10^3$ poise (100 Pa·s), noted T3, measured according to ISO standard 7884-2 and expressed in degrees Celsius, close to the temperature of the glass in the die, the difference between the temperature T3 and the temperature at the liquidus, noted "T3-Tliq" and expressed in degrees Celsius, which represents a forming margin and should be the highest possible, the bulk value of Young's modulus for the glass measured according to ASTM standard C 1259-07, expressed in GPa, the density or mass per unit volume of glass measured by the Archimedes method, expressed in $g \cdot cm^{-3}$, specific Young's modulus, which corresponds to the ratio of Young's modulus to the mass per unit volume of the glass sample, expressed in $GPa \cdot cm^3 \cdot g^{-1}$, the hydrolytic resistance, evaluated by the "DGG" method (Deutsche Glastechniche Gesellschaft by Fisher and Fischer and Tepoel; Glastech. Ber.; vol. VI, p. 522; 1928) that consists of measuring the attack of water on glass. For this, 10 g of ground glass (particle size: 360-400 μm) are immersed in 100 ml of water at 98° C. for 5 hours. After cooling rapidly, the solution is filtered. The result, noted "DDG", is expressed in mg and corresponds to the weight of dry residue, expressed in mg/10 g of glass, the rate of solution in an acid medium, noted "$kSiO_2$" representing the rate of solution of fibers with a diameter of 10 micrometers left for 6 hours in a static saline solution buffered to a pH of 4.5. The saline solution contains, in addition to the pH buffer, sodium chloride and sodium citrate in respective contents of 5 g/L and 0.15 g/L, the ratio between the area of glass exposed and the volume of the attack solution being 0.5 $cm^{-1}$. This rate of solution, expressed in $ng/cm^2 \cdot h$, expresses the quantity of glass dissolved per units of area of the fibers and time.

|  | C1 | C2 | 1 | 2 | 3 | 4 |
|---|---|---|---|---|---|---|
| $SiO_2$ | 61 | 46.5 | 47.5 | 47.0 | 47.7 | 48.1 |
| $Al_2O_3$ | 13 | 27.3 | 21.0 | 24.1 | 24.1 | 23.9 |
| $B_2O_3$ | 0 | 0 | 0 | 0 | 0 | 0 |
| CaO | 22 | 14.9 | 6.5 | 9.0 | 8.2 | 7.4 |
| MgO | 3 | 2.8 | 3.6 | 4.7 | 3.0 | 2.2 |
| $Na_2O$ | 0.4 | 7.2 | 13.9 | 12.5 | 11.5 | 13.7 |
| $K_2O$ | 0.4 | 0.9 | 6.9 | 2.1 | 5.0 | 4.2 |
| $Fe_2O_3 + TiO_2 + SO_3$ |  |  | 0.6 | 0.6 | 0.5 | 0.5 |
| T3 (° C.) | 1268 | 1285 | 1250 | 1251 | 1294 | 1295 |
| T3 − Tliq (° C.) | 88 | −25 | 70 | 61 | 94 | 75 |
| Young's modulus (GPa) | 88.0 | 88.4 | 79.5 | 84.0 | 80.2 | 80.1 |
| Density ($g \cdot cm^{-3}$) | 2.66 | 2.62 | 2.56 | 2.60 | 2.54 | 2.57 |

-continued

|  | C1 | C2 | 1 | 2 | 3 | 4 |
|---|---|---|---|---|---|---|
| Specific modulus (GPa · cm³ · g⁻¹) | 33.0 | 33.7 | 31.0 | 32.3 | 31.6 | 31.2 |
| DGG (mg) | 8.4 |  | 10.9 | 7.1 | 8.7 | 9.3 |
| $kSiO_2$ (×10³) | <1 |  | 18 |  |  |  |

Examples 1 to 4 according to the invention exhibit properties close to those of example C1 in terms of fiber-forming temperature, forming margin, specific modulus or hydrolytic resistance. They also exhibit a very much improved forming margin compared with example C2, which may not be correctly formed into fibers by mechanical drawing on account of a negative forming margin. The forming margin of glasses according to the invention, above 50° C., and that may even extend to 94° C. (ex. 3) guarantees, on the other hand, very good quality fiber formation. The biosolubility of glasses according to the invention is also very satisfactory.

The invention claimed is:

1. A glass yarn obtained by a method consisting of mechanically drawing molten glass threads flowing from orifices disposed at the base of a die, of which the chemical composition is substantially free from boron oxide and comprises the following constituents within the limits defined hereinafter expressed in percentages by weight:

| $SiO_2$ | 40 to 50 |
|---|---|
| $Al_2O_3$ | 18 to 28 |
| CaO | 4 to 15 |
| MgO | 0 to 6 |
| $Na_2O$ | 11 to 13.9 |
| $Na_2O + K_2O + Li_2O$ | 13 to 20.8 |

2. The glass yarn as claimed in claim 1, wherein the $SiO_2$ content is less than or equal to 49% and greater than or equal to 42%.

3. The glass yarn as claimed in claim 1, wherein the $Al_2O_3$ content is less than or equal to 27% and greater than or equal to 19%.

4. The glass yarn as claimed in claim 1, wherein the sum $SiO_2+Al_2O_3$ is greater than or equal to 66% and less than or equal to 75%.

5. The glass yarn as claimed in claim 1, wherein the CaO content is greater than or equal to 5% and less than or equal to 14%.

6. The glass yarn as claimed in claim 1, wherein the MgO content is greater than or equal to 1% and less than or equal to 5%.

7. The glass yarn as claimed in claim 1, wherein the sum of the CaO and MgO contents is less than or equal to 15%.

8. The glass yarn as claimed in claim 1, wherein the $Na_2O$ content is greater than or equal to 11% and less than or equal to 13.5%.

9. The glass yarn as claimed in claim 1, wherein the $K_2O$ content is greater than or equal to 1% and less than or equal to 8%.

10. The glass yarn as claimed in claim 1, wherein the total content of alkali metal oxides is less than or equal to 19% and greater than or equal to 14%.

11. The glass yarn as claimed in claim 1, wherein the sum of the contents of $SiO_2$, $Al_2O_3$, CaO, MgO, $Na_2O$ and $K_2O$ is greater than or equal to 95%.

12. The glass yarn as claimed in claim 1, which comprises:

| $Na_2O$ | 11 to 13.7 |
|---|---|
| $Na_2O + K_2O + Li_2O$ | 13 to 20. |

13. A composite of glass yarns and organic and/or inorganic materials comprising glass yarns as defined in claim 1.

14. A method for producing glass yarns as claimed in claim 1, comprising drawing in the form of one or more webs of continuous filaments from a multiplicity of molten glass threads flowing from a multiplicity of orifices disposed at the base of one or more dies, and assembling said filaments into one or more yarns, collected on a moving support.

* * * * *